US010884610B2

(12) United States Patent
Aradilla et al.

(10) Patent No.: US 10,884,610 B2
(45) Date of Patent: Jan. 5, 2021

(54) SYSTEM AND METHOD FOR RECOGNIZING HANDWRITTEN STROKE INPUT

(71) Applicant: MyScript, Nantes (FR)

(72) Inventors: Guillermo Aradilla, Nantes (FR); Gael Manson, Nantes (FR)

(73) Assignee: MYSCRIPT, Nantes (FR)

( * ) Notice: Subject to any disclaimer, the term of this patent is extended or adjusted under 35 U.S.C. 154(b) by 0 days.

(21) Appl. No.: 15/466,464

(22) Filed: Mar. 22, 2017

(65) Prior Publication Data

US 2018/0129408 A1 May 10, 2018

(30) Foreign Application Priority Data

Nov. 4, 2016 (EP) .................................... 16290214

(51) Int. Cl.
*G06F 3/0488* (2013.01)
*G06F 3/023* (2006.01)
(Continued)

(52) U.S. Cl.
CPC ........ *G06F 3/04883* (2013.01); *G06F 3/0233* (2013.01); *G06F 3/0236* (2013.01);
(Continued)

(58) Field of Classification Search
None
See application file for complete search history.

(56) References Cited

U.S. PATENT DOCUMENTS 7,098,896 B2   8/2006   Kushler et al.
7,250,938 B2   7/2007   Kirkland et al.
(Continued)

FOREIGN PATENT DOCUMENTS

CA    2353159        9/2012
WO    2014127671     8/2014
WO    2014139173     9/2014

OTHER PUBLICATIONS

International Search Report issued for PCT/EP2017/078155 dated Jan. 17, 2018 (4 pages).
(Continued)

*Primary Examiner* — Jiangeng Sun
(74) *Attorney, Agent, or Firm* — McDermott Will & Emery LLP

(57) ABSTRACT

A system, method and computer program product for use in recognizing content associated with handwritten stroke input to a computing device is provided. The computing device is connected to an input interface. A user is able to provide input by applying pressure to or gesturing above the input interface using a finger or an instrument such as a stylus or pen. The computing device has an input management system for recognizing content defined by the input. The input management system is configured to detect input of a handwritten stroke with respect to the interactive key layout, characterize the detected handwritten stroke by a reference stroke by determining a sequence of reference points associated with a sequence of interactive keys of the interactive key layout, assign probability scores to candidate characters, and cause recognition of sequences of characters by applying a language model in accordance with the assigned probability scores.

6 Claims, 9 Drawing Sheets

(51) Int. Cl.
  *G06F 40/171* (2020.01)
  *G06F 40/274* (2020.01)
  *G06F 40/279* (2020.01)

(52) U.S. Cl.
  CPC ........ *G06F 3/04886* (2013.01); *G06F 40/171* (2020.01); *G06F 40/274* (2020.01); *G06F 40/279* (2020.01)

(56) References Cited

U.S. PATENT DOCUMENTS

| | | | |
|---|---|---|---|
| 7,251,367 B2 | 7/2007 | Zhai | |
| 7,382,358 B2 | 6/2008 | Kushler et al. | |
| 7,453,439 B1 * | 11/2008 | Kushler | G06F 3/0237 |
| | | | 345/168 |
| 7,487,461 B2 | 2/2009 | Zhai et al. | |
| 7,706,616 B2 | 4/2010 | Kristensson et al. | |
| 7,750,891 B2 | 7/2010 | Stephanick et al. | |
| 7,895,518 B2 | 2/2011 | Kristensson | |
| 8,484,573 B1 | 7/2013 | Zhai et al. | |
| 8,667,414 B2 | 3/2014 | Zhai et al. | |
| 8,701,050 B1 | 4/2014 | Starner et al. | |
| 8,756,499 B1 * | 6/2014 | Kataoka | G06F 3/04883 |
| | | | 715/259 |
| 8,782,549 B2 | 7/2014 | Ouyang et al. | |
| 8,843,845 B2 | 9/2014 | Ouyang et al. | |
| 8,850,350 B2 | 9/2014 | Bi et al. | |
| 8,884,872 B2 | 11/2014 | Kushler | |
| 8,887,103 B1 | 11/2014 | Bi et al. | |
| 8,914,751 B2 | 12/2014 | Bi et al. | |
| 8,918,734 B2 | 12/2014 | Suraqui | |
| 8,994,681 B2 | 3/2015 | Kataoka et al. | |
| 8,997,013 B2 | 3/2015 | Starner et al. | |
| 9,021,379 B1 | 4/2015 | Patel et al. | |
| 9,021,380 B2 | 4/2015 | Zhai et al. | |
| 9,244,612 B1 * | 1/2016 | Azenkot | G06F 3/04883 |
| 9,298,276 B1 * | 3/2016 | Bi | G06F 3/0236 |
| 9,952,763 B1 * | 4/2018 | Bi | G06F 3/04883 |
| 2010/0020037 A1 * | 1/2010 | Narita | G06T 3/40 |
| | | | 345/173 |
| 2010/0318903 A1 * | 12/2010 | Ferren | G06F 3/0237 |
| | | | 715/259 |
| 2012/0127080 A1 | 5/2012 | Kushler et al. | |
| 2012/0127082 A1 | 5/2012 | Kushler et al. | |
| 2012/0127083 A1 | 5/2012 | Kushler et al. | |
| 2013/0046544 A1 | 2/2013 | Kay et al. | |
| 2014/0015753 A1 | 1/2014 | Pai | |
| 2014/0028603 A1 | 1/2014 | Xie et al. | |
| 2014/0098036 A1 | 4/2014 | Paek et al. | |
| 2014/0108990 A1 | 4/2014 | Zhai et al. | |
| 2014/0108993 A1 | 4/2014 | Zhai et al. | |
| 2014/0115522 A1 | 4/2014 | Kataoka et al. | |
| 2014/0218299 A1 | 8/2014 | Kataoka et al. | |
| 2014/0278374 A1 | 9/2014 | Kristensson et al. | |
| 2014/0327622 A1 | 11/2014 | Ouyang et al. | |
| 2014/0359434 A1 | 12/2014 | Dai et al. | |
| 2014/0359515 A1 | 12/2014 | Medlock et al. | |
| 2014/0365878 A1 | 12/2014 | Dai et al. | |
| 2014/0368434 A1 | 12/2014 | Paek et al. | |
| 2015/0177981 A1 * | 6/2015 | Starner | G06F 3/04886 |
| | | | 345/173 |
| 2016/0171804 A1 * | 6/2016 | Chaar | G06F 3/0418 |
| | | | 340/5.52 |
| 2016/0224240 A1 | 8/2016 | Foerster et al. | |
| 2017/0185286 A1 * | 6/2017 | Beaufays | G06F 3/017 |
| 2020/0105292 A1 * | 4/2020 | Large | G10L 25/30 |

OTHER PUBLICATIONS

Written Opinion of the International Searching Authority issued for PCT/EP2017/078155 dated Jan. 17, 2018 (7 pages).

* cited by examiner

SYSTEM AND METHOD FOR RECOGNIZING HANDWRITTEN STROKE INPUT

CROSS-REFERENCE TO RELATED APPLICATIONS

This application claims priority to European Application No. 16 290 214.2 filed on Nov. 4, 2016, the entire contents of which is incorporated by reference herein.

TECHNICAL FIELD

The present description relates generally to the field of computer input recognition systems and methods using computing device interfaces. The present description relates more specifically to systems and methods for management of typing input using handwriting recognition technology.

BACKGROUND

Computing devices continue to become more ubiquitous to daily life. They take the form of computer desktops, laptop computers, tablet computers, hybrid computers (2-in-1s), e-book readers, mobile phones, smartphones, wearable computers (including smartwatches, smart glasses/headsets), global positioning system (GPS) units, enterprise digital assistants (EDAs), personal digital assistants (PDAs), game consoles, and the like. Further, computing devices are being incorporated into vehicles and equipment, such as cars, trucks, farm equipment, manufacturing equipment, building environment control (e.g., lighting, HVAC), and home and commercial appliances.

Computing devices generally consist of at least one processing element, such as a central processing unit (CPU), some form of memory, and input and output devices. The variety of computing devices and their subsequent uses necessitate a variety of interfaces and input devices. One such input device is a touch sensitive surface such as a touch screen or touch pad wherein user input is received through contact between the user's finger or an instrument such as a pen or stylus and the touch sensitive surface. Another input device is an input surface that senses gestures made by a user above the input surface. A further input device is a position detection system which detects the relative position of either touch or non-touch interactions with a non-touch physical or virtual surface. Any of these methods of input can be used generally for input through interaction with a displayed or graphical (virtual) keyboard through typing or "stroke-like" typing.

Virtual or 'soft' keyboards are widely used now and many options and applications beyond those that come standard with portable (and non-portable) computing devices are available, particularly for complex languages, such as those having many characters beyond those easily placed on a single keyboard panel or layout, for non-text characters, such as numbers, symbols and messaging characters (e.g., emoticons or "emojis"), and for increased speed.

With respect to increased speed, there is a growing popularity of keyboards which accept stroke-like input, such as the SWYPE®, SWIFTKEY® and TOUCHPAL® keyboards. These keyboards allow a continuous stroke to be input over the virtual keyboard for selection of the underlying keys. As such, unlike traditional keyboard input in which each key is struck or interacted with by a user for entry of text or commands, stroked 'keying' inherently strikes more keys than necessary to input a word, for example. This leads to ambiguity in the input requiring disambiguation processing to be performed.

Several techniques have been developed to provide this disambiguation. These conventional techniques include taking characteristics in the stroke path, such as bend, speed, direction, into account to determine the intended keys, as disclosed for example in Canadian Patent No. 2353159 and U.S. Pat. Nos. 7,098,896, 7,250,938 and 7,750,891, comparing the stroke path to expected paths through key strings, as disclosed for example in U.S. Pat. Nos. 7,895,518, 8,712,755 and 9,182,831, using fuzzy logic and statistical models with respect to the keyboard layout, as disclosed for example in US Patent Application Publication No. 2014/0359515 and U.S. Pat. Nos. 7,250,938, 7,750,891 and 8,667,414, or using linguistic techniques, such as lexica and language models, as disclosed for example in U.S. Pat. Nos. 8,756,499, 8,782,549, 8,843,845, 9,182,831 and 9,454,240.

Each of these conventional techniques provide reasonable success in accurately disambiguating stroke-typed input, including the ability to complete words and predict next words or characters, such as grammatical symbols. Each of these techniques however require the production of unique recognition systems or engines for stroke-typing.

SUMMARY

The examples of the present disclosure that are described herein below provide systems and methods for recognizing content associated with handwritten stroke input to computing devices. Each computing device is connected to an input interface and has a processor, a memory and at least one non-transitory computer readable medium for recognizing content under control of the processor.

In some examples, a system is provided in which the at least one non-transitory computer readable medium is configured to detect input, with respect to an interactive key layout displayed on an interface surface of a computing device, of a handwritten stroke with respect to the interactive key layout, characterize the detected handwritten stroke by a reference stroke by determining a sequence of reference points associated with a sequence of interactive keys of the interactive key layout, assign one or more probability scores to one or more candidate characters associated with each key of the interactive key sequence, and cause recognition of one or more sequences of characters by applying a language model in accordance with the assigned probability scores.

Each reference point may be determined in relation to the position of one or more points on the detected handwritten stroke to a characteristic of one or more of the interactive keys. Each reference point may be a centroid of the one or more points.

The at least one non-transitory computer readable medium may be configured to determine one or more combined probability scores of at least a subset of candidate characters of a combination of consecutive points of the sequence of reference points, and cause recognition of one or more sequences of characters by applying a language model in accordance with the determined combined probability scores.

In some examples, a method is provided including the steps of detecting input, with respect to an interactive key layout displayed on an interface surface of a computing device, of a handwritten stroke with respect to the interactive key layout, characterizing the detected handwritten stroke by a reference stroke by determining a sequence of reference points associated with a sequence of interactive keys of the interactive key layout, assigning one or more probability scores to one or more candidate characters associated with each key of the interactive key sequence, and causing recognition of one or more sequences of characters by applying a language model in accordance with the assigned probability scores.

Each reference point may be determined in relation to the position of one or more points on the detected handwritten stroke to a characteristic of one or more of the interactive keys. Each reference point may be a centroid of the one or more points.

The method may include determining one or more combined probability scores of at least a subset of candidate characters of a combination of consecutive points of the sequence of reference points, and causing recognition of one or more sequences of characters by applying a language model in accordance with the determined combined probability scores.

In some examples, a non-transitory computer readable medium having a computer readable program code embodied therein is provided. The computer readable program code may be adapted to be executed to implement a method including the steps of detecting input, with respect to an interactive key layout displayed on an interface surface of a computing device, of a handwritten stroke with respect to the interactive key layout, characterizing the detected handwritten stroke by a reference stroke by determining a sequence of reference points associated with a sequence of interactive keys of the interactive key layout, assigning one or more probability scores to one or more candidate characters associated with each key of the interactive key sequence, and causing recognition of one or more sequences of characters by applying a language model in accordance with the assigned probability scores.

Each reference point may be determined in relation to the position of one or more points on the detected handwritten stroke to a characteristic of one or more of the interactive keys. Each reference point may be a centroid of the one or more points.

The method may include determining one or more combined probability scores of at least a subset of candidate characters of a combination of consecutive points of the sequence of reference points, and causing recognition of one or more sequences of characters by applying a language model in accordance with the determined combined probability scores.

BRIEF DESCRIPTION OF THE DRAWINGS

The present system and method will be more fully understood from the following detailed description of the examples thereof, taken together with the drawings. In the drawings like reference numerals depict like elements. In the drawings.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The use of the term 'text' in the present description is understood as encompassing all alphanumeric characters, and strings thereof, in any written language and common place non-alphanumeric characters, e.g., symbols, used in written text. Further, the term 'non-text' in the present description is understood as encompassing freeform handwritten or hand-drawn content and rendered text and image data, as well as non-alphanumeric characters, and strings thereof, and alphanumeric characters, and strings thereof, which are used in non-text contexts. Furthermore, the examples shown in these drawings are in a left-to-right written language context, and therefore any reference to positions can be adapted for written languages having different directional formats.

The systems and methods described herein may utilize recognition of users' natural writing and drawing styles input to a computing device via an input interface, such as a touch sensitive screen, connected to, or of, the computing device or via an input device, such as a digital pen or mouse, connected to the computing device or via a physical or virtual surface monitored by a position detection system.

Whilst the various examples are described with respect to recognition of handwriting input using so-called online recognition techniques, it is understood that application is possible to other forms of input for recognition, such as offline recognition in which images rather than digital ink are recognized. The terms hand-drawing and handwriting are used interchangeably herein to define the creation of digital content by users through use of their hands either directly onto a digital or digitally connected medium or via an input tool, such as a hand-held stylus. The term "hand" is used herein to provide concise description of the input techniques, however the use of other parts of a users' body for similar input is included in this definition, such as foot, mouth and eye.

Figure 1:
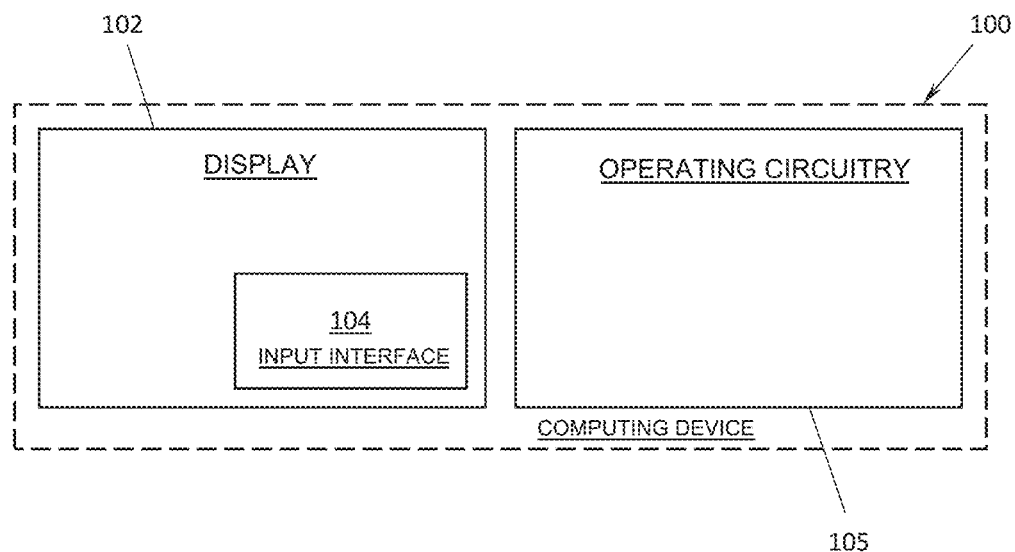
FIG. 1 shows a block diagram of a computing device in accordance with an example of the present system and method.

FIG. 1 shows a block diagram of an example computing or digital device 100. The computing device may be a computer desktop, laptop computer, tablet computer, hybrid computers (2-in-1s), e-book reader, mobile phone, smartphone, wearable computer, digital watch, interactive whiteboard, global positioning system (GPS) unit, enterprise digital assistant (EDA), personal digital assistant (PDA), game console, or the like. The computing device 100 includes components of at least one processing element, some form of memory and input and/or output (I/O) devices. The components communicate with each other through inputs and outputs, such as connectors, lines, buses, cables, buffers, electromagnetic links, networks, modems, transducers, IR ports, antennas, or others known to those of ordinary skill in the art.

The illustrated example of the computing device 100 has at least one display 102 for outputting data from the computing device such as images, text, and video. The display 102 may use LCD, plasma, LED, iOLED, CRT, or any other appropriate technology that is or is not touch sensitive as known to those of ordinary skill in the art. At least some of the display 102 is co-located with at least one input interface 104. The input interface 104 may be a surface employing technology such as resistive, surface acoustic wave, capacitive, infrared grid, infrared acrylic projection, optical imaging, dispersive signal technology, acoustic pulse recognition, or any other appropriate technology as known to those of ordinary skill in the art to receive user input. The input interface 104 may be bounded by a permanent or video-generated border that clearly identifies its boundaries. Instead of, or additional to, an on-board display, the computing device 100 may have a projected display capability or is able to operate with a projected display, such that the input interface is a virtual surface. Further, the display itself may be separate from and connected to the computing device.

The computing device 100 may include one or more additional I/O devices (or peripherals) that are communicatively coupled via a local interface. The additional I/O devices may include input devices such as a keyboard, mouse, scanner, microphone, touchpads, bar code readers, laser readers, radio-frequency device readers, or any other appropriate technology known to those of ordinary skill in the art. Further, the I/O devices may include output devices such as a printer, bar code printers, or any other appropriate technology known to those of ordinary skill in the art. Furthermore, the I/O devices may include communications devices that communicate both inputs and outputs such as a modulator/demodulator (modem; for accessing another device, system, or network), a radio frequency (RF) or other transceiver, a telephonic interface, a bridge, a router, or any other appropriate technology known to those of ordinary skill in the art. The local interface may have additional elements to enable communications, such as controllers, buffers (caches), drivers, repeaters, and receivers, which are omitted for simplicity but known to those of skill in the art. Further, the local interface may include address, control, and/or data connections to enable appropriate communications among the other computer components.

Figure 2:
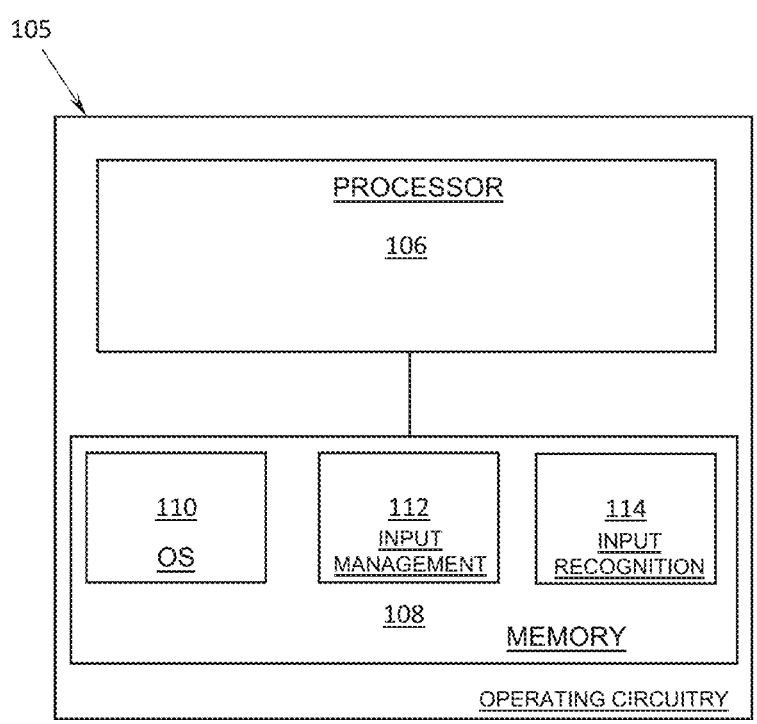
FIG. 2 shows a block diagram of example operating circuitry of the computing device.

The computing device 100 has operating circuitry 105. FIG. 2 shows a block diagram of an example of the operating circuitry 105. In this example, the operating circuitry 105 includes a processor 106, which is a hardware device for executing software, particularly software stored in a memory 108. The processor can be any custom made or commercially available general purpose processor, a central processing unit (CPU), commercially available microprocessors including a semiconductor based microprocessor (in the form of a microchip or chipset), microcontroller, digital signal processor (DSP), application specific integrated circuit (ASIC), field programmable gate array (FPGA) or other programmable logic device, discrete gate or transistor logic, discrete hardware components, state machine, or any combination thereof designed for executing software instructions known to those of ordinary skill in the art.

The memory 108 can include any one or a combination of volatile memory elements (e.g., random access memory (RAM, such as DRAM, SRAM, or SDRAM)) and nonvolatile memory elements (e.g., ROM, EPROM, flash PROM, EEPROM, hard drive, magnetic or optical tape, memory registers, CD-ROM, WORM, DVD, redundant array of inexpensive disks (RAID), another direct access storage device (DASD), or any other magnetic, resistive or phase-change nonvolatile memory). Moreover, the memory 108 may incorporate electronic, magnetic, optical, and/or other types of storage media. The memory 108 can have a distributed architecture where various components are situated remote from one another but can also be accessed by the processor 106. Further, the memory 108 may be remote from the device, such as at a server or cloud-based system, which is remotely accessible by the computing device 100. The memory 108 is coupled to the processor 106, so the processor 106 can read information from and write information to the memory 108. In the alternative, the memory 108 may be integral to the processor 106. In another example, the processor 106 and the memory 108 may both reside in a single ASIC or other integrated circuit.

The software in the memory 108 includes an operating system 110, an input management system 112 and an input recognition system 114, which may each include one or more separate computer programs. Each of these has an ordered listing of executable instructions for implementing logical functions. The operating system 110 controls the execution of the input management system 112 and the input recognition system 114, or may incorporate the functions of these systems. The operating system 110 may be any proprietary operating system or a commercially or freely available operating system, such as WEBOS, WINDOWS®, MAC and IPHONE OS®, LINUX, and ANDROID. It is understood that other operating systems may also be utilized. Alternatively, the input management system 112 and input recognition system 114 of the present system and method may be provided without use of an operating system.

The input management system 112 includes one or more processing elements related to detection, management and treatment of user input. The software may also include one or more applications related to input recognition, different functions, or both. Some examples of other applications include a text editor, telephone dialer, contacts directory, instant messaging facility, computer-aided design (CAD) program, email program, word processing program, web browser, and camera. The input management system 112, and the applications, include program(s) provided with the computing device 100 upon manufacture and may further include programs uploaded or downloaded into the computing device 100 after manufacture.

The input management system 112 of the present system and method manages input into the computing device 100 via the input interface 104, for example. Input is managed through the provision of input tools to users and the handling of the input for processing and the like. The input tools include the provision and display of dedicated input areas on the input interface 104 or the provision of the (substantially) entire input interface 104 for the receipt of user input via interaction with or in relation to the input interface 104. The dimensions and functionality of these input areas are provided in correspondence with, and responsive to, the dimensions and orientation of the display area of the device display 102 in a manner well understood by those skilled in the art.

Figure 3:
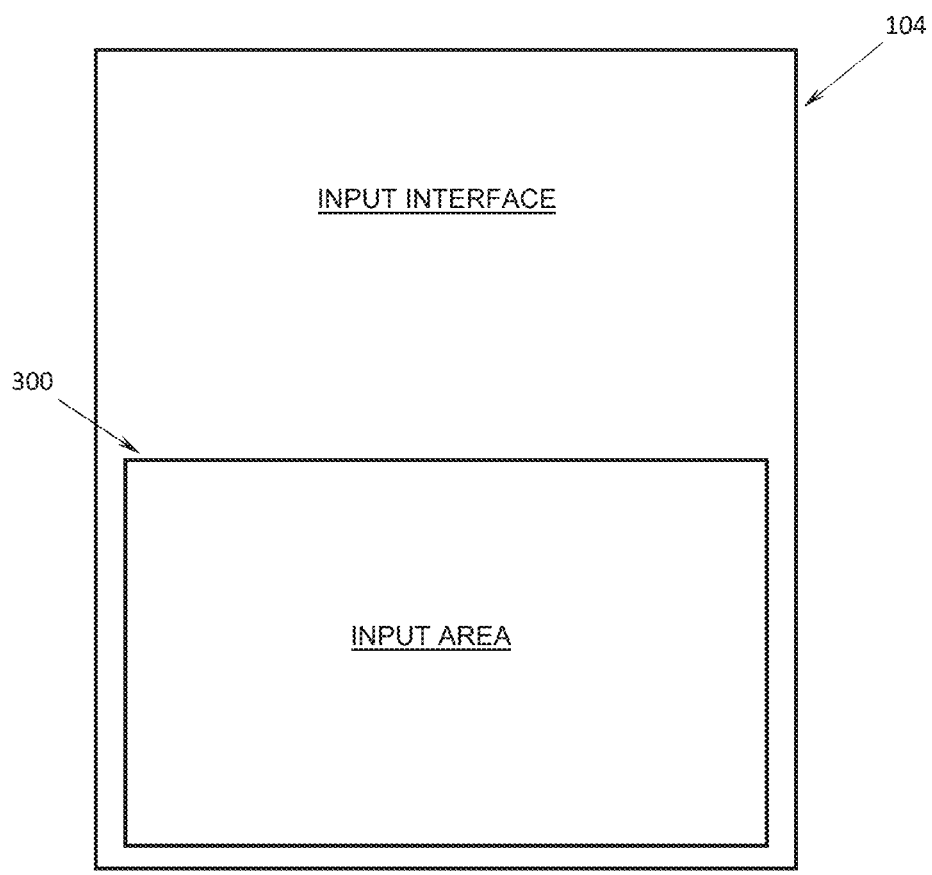
FIG. 3 shows a schematic view of an input area provided by an input management system on a portion of an input interface of the computing device in accordance with an example of the present system and method.

FIG. 3 shows an example input area 300 displayed by the input management system 112 on the input interface 104. The input area 300 is an area or zone of the display of the computing device 100 which is to be used for the input of content and/or control gestures by users. In other examples, substantially all of the input interface may be configured as the input area. Any digital device user is already accustomed to gesturing on screen to type or write content and to enter control commands for application and device navigation, content editing, etc. Such interactions with the input interface 104 of the computing device 100 are generally detected by the processor 106 and this information is communicated to the input management system 112 for interpretation and recognition processing.

Figure 4:
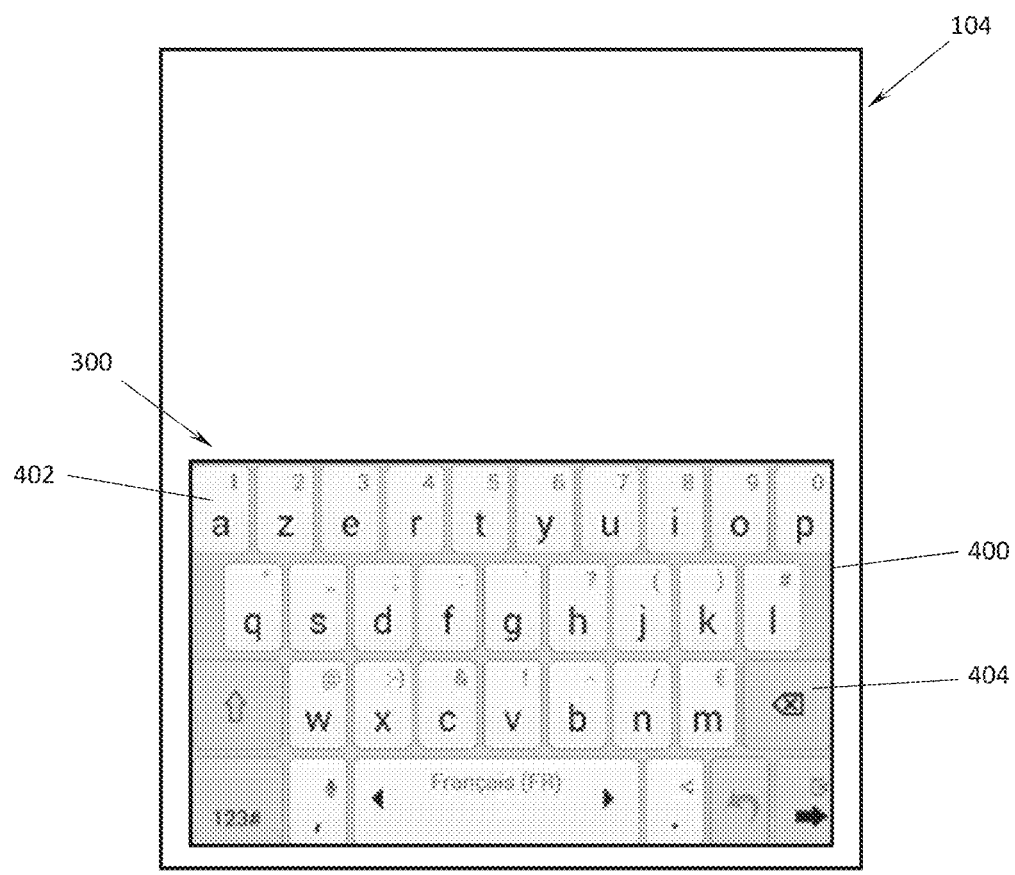
FIG. 4 shows a schematic view of an example visual rendering of a keyboard layout in the input area for receiving typing input.

The input area 300 is configured to receive user input through single-point or single-position gestures or interactions, such as tap, short and long press, multi-point or multi-position gestures or interactions, such as double tap, and stroke gestures, such as swipe. In order to translate these gestures to input of specific content or commands, an interactive (virtual) keyboard panel 400 may be displayed in the input area 300, such as the 'azerty' style keyboard layout variant of the 'qwerty' key or keyboard layout shown in FIG. 4.

The illustrated layout of the keyboard panel 400 is merely an example, and many other known keyboard layouts and methods, e.g., qwerty or azerty mapped layouts for language specific variants like BoPoMoFo, Hangul, JIS, Hanyu Pinyin, phonetic, non-qwerty layouts for different languages like Jcuken, InScript, reduced keyboard, such as T9 or T12, or yet-to-be-developed keyboard layouts, are applicable to the present system and method used either singularly with respect to the computing device or selectively (discussed in detail later) by storage of different keyboard layouts in the memory 108, for example. Further, layouts that provide access to non-alphabetic characters, such as numerals, grammatical marks, emojis, etc. are also applicable, typically selectively.

As discussed, the example keyboard panel 400 includes an interactive key or keyboard layout. The keyboard layout has content keys 402 which when interacted with by users, such as through a single-point gesture or 'strike' thereon or over, result in the input of content, and command keys 404 which when interacted with by users, such as through a single-point gesture or strike thereon or over, result in the input of control commands, e.g., applying a tap on the "backspace" key causes the backspacing deletion of previously input characters, or launching of keyboard sub- or dedicated layouts, e.g., special character layouts having keys for numerals, grammatical marks, emojis, language specific layouts as described above, language alternatives layouts providing access to accents, character alternatives based on strokes, etc. Both the content and command keys are generally displayed with character depictions corresponding to the content or command input which results from interaction with that key.

Users may provide input with respect to the keyboard panel using a finger or some instrument such as a pen or stylus suitable for use with the input interface, and this input is detected by the input management system 112. The user may also provide input by making a gesture above the input interface 104 if technology that senses or images motion in the vicinity of the input interface 104 is being used, or with a peripheral device of the computing device 100, such as a mouse or joystick, or with a projected interface, e.g., image processing of a passive plane surface to determine the input sequence and gesture signals.

The present system and method handles the user keyboard input to provide an input signal of a typing stroke which is determined by the present system and method as a sequence of points characterized by at least the stroke initiation location, the stroke termination location, and the path connecting the stroke initiation and termination locations as captured by the input management system 112 and/or input recognition system 114. Further information such as timing, pressure, angle at a number of sample points along the path may also be captured to provide deeper detail of the keyboard strokes. The input management system 112 in conjunction with the input recognition system 114 recognizes one or more sequences of keys of the keyboard layout corresponding to the determined sequences of points.

Figure 5:
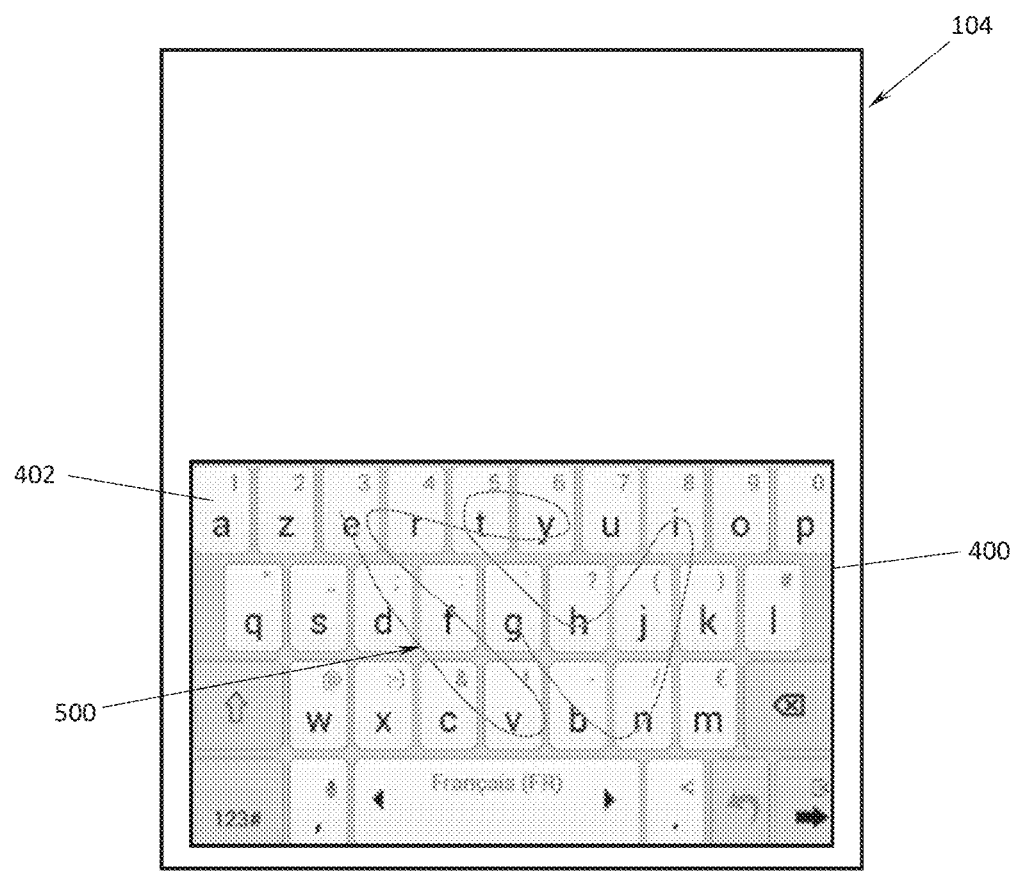
FIG. 5 shows the keyboard layout of FIG. 4 with stroke-typing input depicted thereon.

FIG. 5 shows the keyboard panel 400 with example stroke-typing input 500. The stroke-typing input 500 includes a single continuous stroke which successively passes over or on (or near) the keys "e", "d", ("f"), "c", "v", ("g"), "f", "d", "e", "r", "t", "y", "t", "g", "h", "j", "i", "k", ("j"), "n", "b", "v" and "g". Clearly these keys on the path of the stroke do not all together form a word or other textual input, and as such the input management system 112 determines which of these keys (or other keys) the user intended to interact with in order to input content, such as one or more text elements. The manner of this determination is now described.

The input management system 112 may be configured to (temporarily) render the stroke-typing input 500 as so-called "digital ink" on the keyboard panel 400, similar to the depiction in FIG. 5, for example. This display of the digital ink provides feedback to users that the stroke-typed path has been received by the input management system 112. The input of content via the input area 300 may cause the rendered display of the content elsewhere on the display 102, such as a component of an active application of the computing device 100, in 'typeset ink' (e.g., fontified text), for example. In the present system and method the input management system 112 causes display of the input content either directly or via communication of the input to the active application and/or operating system 110, for example, in a manner similar to that conventionally employed by operating systems and components and applications thereof. That is, for typing input the content is rendered as digital objects, e.g., typeset ink. The displayed content is content which has been recognized and interpreted by the input recognition system 114. As such, the present system and method may produce the interpreted content as ink objects.

Ink objects include links between the rendered display of the typeset ink and the recognition candidates produced by the recognition processing, so that the displayed content is provided as interactive ink. This may be achieved as described in U.S. patent application Ser. No. 15/083,195 titled "System and Method for Digital Ink Interactivity" filed claiming a priority date of 7 Jan. 2016 in the name of the present Applicant and Assignee, the entire contents of which is incorporated by reference herein.

To achieve display of content, the input management system 112 is configured to detect the input of typing at the input area 300 and cause the input content (or commands) to be recognized by the input recognition system 114 under control of the processor 106, for example. The input recognition system 114 and any of its components, with support and compliance capabilities, may be a source program, executable program (object code), script, application, or any other entity having a set of instructions to be performed. When a source program, the program needs to be translated via a compiler, assembler, interpreter, or the like, which may or may not be included within the memory 108, so as to operate properly in connection with the operating system 110.

Furthermore, the input recognition system with support and compliance capabilities can be written as (a) an object oriented programming language, which has classes of data and methods; (b) a procedure programming language, which has routines, subroutines, and/or functions, for example but not limited to C, C++, Pascal, Basic, Fortran, Cobol, Perl, Java, Objective C, Swift, Python, C # and Ada; or (c) functional programming languages for example but not limited to Hope, Rex, Common Lisp, Scheme, Clojure, Racket, Erlang, OCaml, Haskell, Prolog, and F #.

Alternatively, the input recognition system 114 may be a method or system for communication with an input recognition system remote from the device, such as server or cloud-based system, but is remotely accessible by the computing device 100 through communications links using the afore-mentioned communications I/O devices of the computing device 100. Further, the input management system 112 and the input recognition system 114 may operate together or be combined as a single system.

With respect to typing input, sequences of points entered on or via the input interface 104 are processed by the processor 106 and routed to the input recognition system 114 for recognition processing, and with respect to stroke-typing input, the continuous stroke entered on or via the input interface 104 are processed by the processor 106 and routed to the input recognition system 114 for recognition processing. Because different users may naturally type the same text with slight variations, the input recognition system 114 accommodates a variety of ways in which each object may be entered whilst being detected as the correct or intended object.

The present Applicant and Assignee has researched and developed handwriting recognition technology over a substantial number of years, and in so doing honed the accuracy and reliability of the underlying handwriting recognition engine. This handwriting recognition is based in part on analysis of the handwritten strokes making up the content. In the present system and method the recognition processing performed on handwritten input of content, e.g., text, is adapted to processing stroke-typing input, where the 'strokes' of the typing input are treated similarly to the 'strokes' of handwriting input. In this way a 'single' multi-modal recognition system that is able to recognition process both handwriting and stroke-typing input is provided, thus obviating provision of a specific recognition engine for either input. This is now described.

Figure 6:
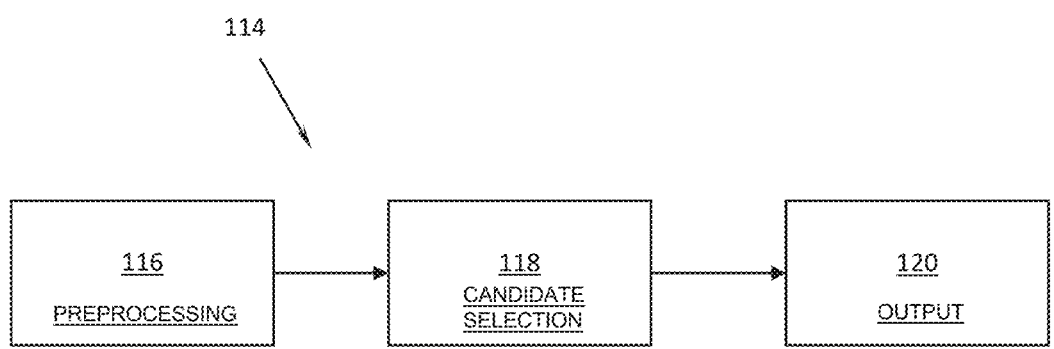
FIG. 6 shows a block diagram of a system for input recognition in accordance with an example of the present system and method.

FIG. 6 is a schematic pictorial of an example of the input recognition system 114. The input recognition system 114 includes stages such as preprocessing 116, candidate selection 118 and output 120. These stages are part of the handwriting recognition system and are adapted to process the detected typing input in relation to the keyboard layout being used.

The preprocessing stage 116 processes the typing input signal (typed ink) to achieve greater accuracy and to reduce processing time during the candidate selection stage 118. This preprocessing may include re-sampling/normalizing (using a background layout), smoothing, and clustering of points. The preprocessed sequences are then passed to the candidate selection stage 118. It is understood that the preprocessing stage may be provided to the input recognition system 114 by another source, such as an optical character recognizer. Further, it is understood that the preprocessing stage may not be employed by the input recognition system 114 if the keyboard input signal is capable of being recognition processed without such preprocessing.

Figure 7:
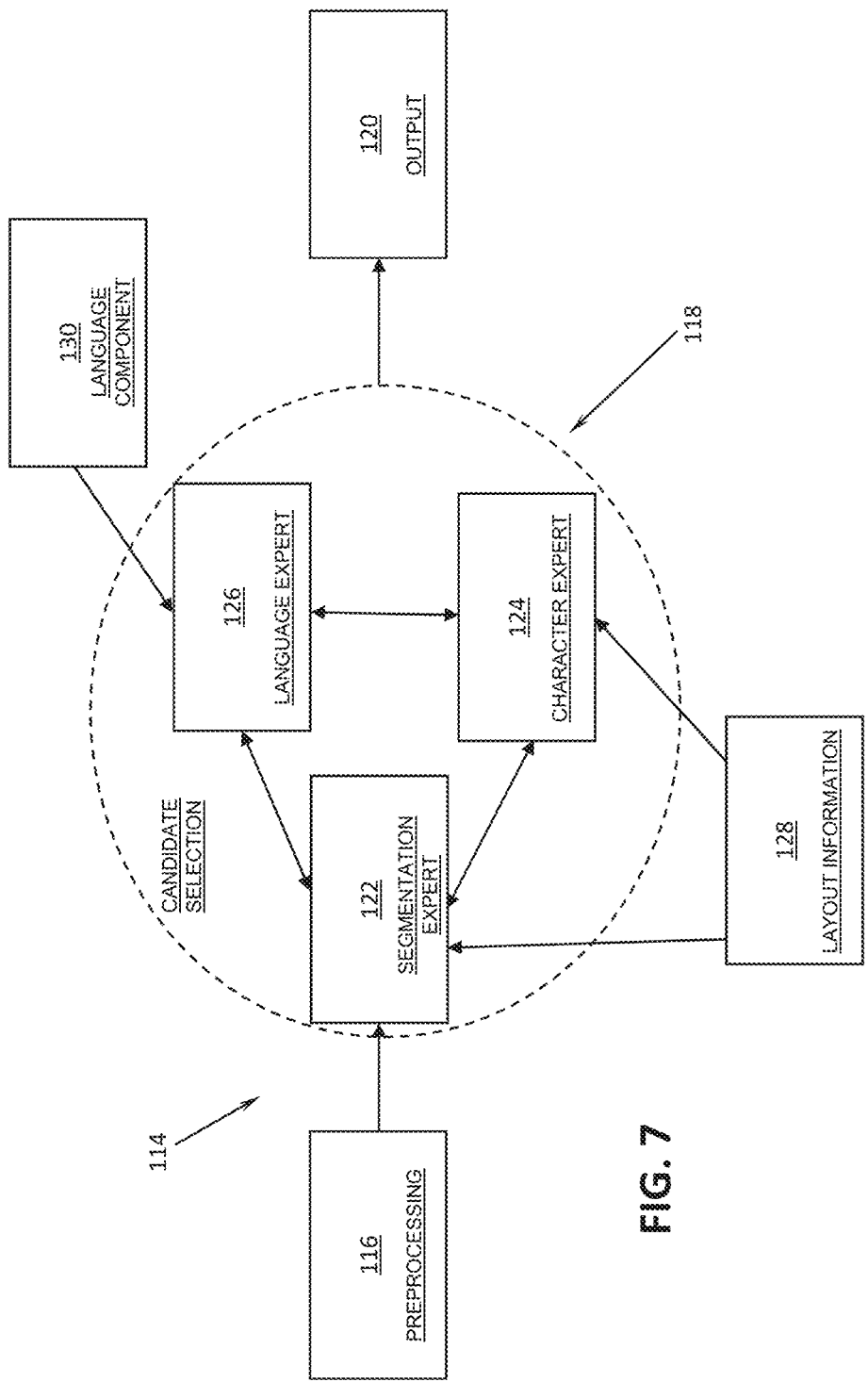
FIG. 7 shows a block diagram illustrating detail of the input recognition system of FIG. 6 in accordance with an example of the present system and method.

The candidate selection stage 118 may include different processing elements or experts. FIG. 7 is a schematic pictorial of the example of FIG. 6 showing schematic detail of the candidate selection stage 118. Three experts, a segmentation expert 122, a character expert 124, and a language expert 126, are illustrated which collaborate through dynamic programming to generate the output 120.

The segmentation expert 122 defines the different ways to segment the input signals into individual element hypotheses which form sequences of elements as a segmentation graph in accordance with interactive key or keyboard layout information 128, which may be stored by the memory 108 of the computing or digital device 100, for example. For single-point interactions with the keyboard panel 400 (e.g., key typing) the element hypotheses are formed in sequences of mandatory points, whereas for multi-point interactions with the keyboard panel 400 (e.g., stroke-typing) the element hypotheses are formed as re-sampled sequences of optional points (described in detail later).

The layout information 128 is provided to, or determined by, the input recognition system 114 from a plurality of possible keyboard layouts that could be displayed as stored in the memory 108 of the digital device 100, for example. Accordingly, the keyboard layout which is being interacted with in the input panel 400 is known, and therefore the relative positions of the detected points in the input panel 400 are mapped to the keys 402 and/or 404 as keystrokes.

Further, because a virtual keyboard does not have physical 'keys' and/or the size of the device display 102 may limit the size of the keys within the keyboard layout and the spacing therebetween, it is possible that users will strike more than one key substantially simultaneously when key typing, strike the wrong key when key typing or stroke-over wrong keys or miss keys when stroke-typing. Such multiple keystrokes make interpretation of the intended key 'press' or stroke-over uncertain.

Thus, from the mapping, the input recognition system 114 may also determine the keys 402/404 which neighbor the detected points. Accordingly, in an example of the present system and method the segmentation graph is produced with paths having nodes according to element hypotheses produced for each or some of these neighboring keys as well (thereby implementing so-called 'fuzzy' logic, described in more detail later).

The character expert 124 provides or assigns probability scores for characters according to the input signal and the layout information 128 and outputs a list of element candidates with probabilities or scores for each node of the segmentation graph (described in detail later).

The language expert 126 generates linguistic meaning for the different paths in the segmentation graph using language models (e.g., grammar, semantics) of the linguistic resource. The language expert 126 checks the candidates suggested by the other experts according to linguistic information provided by a language component 130. The linguistic information can include a lexicon, regular expressions, etc., and is the storage for all static data used by the language expert 126 to execute a language model. Possible forms of this language model are for example but not limited to n-gram, artificial neural networks, recurrent artificial neural networks including long short-term memory networks.

The language expert 126 aims at finding the best recognition path. In one example, the language expert 126 does this by exploring the language model representing the content of linguistic information. In addition to a lexicon constraint, for example, the language model can rely on statistical information, such as finite state automaton (FSA), on one or more given languages which models for how frequent a given sequence of elements appears in the specified language or is used by a specific user to evaluate the linguistic likelihood of the interpretation of a given path of the segmentation graph. The linguistic information is substantially computed off-line, with or without adaption according to the results of recognition and user interactions, and provided to the language expert 126.

After recognition processing, the selected content is provided as the output 120 to the input management system 112. The input management system 112 may then render the output 120 on the display 102 as described earlier, including being included in a list of likely content candidates.

Figure 8:
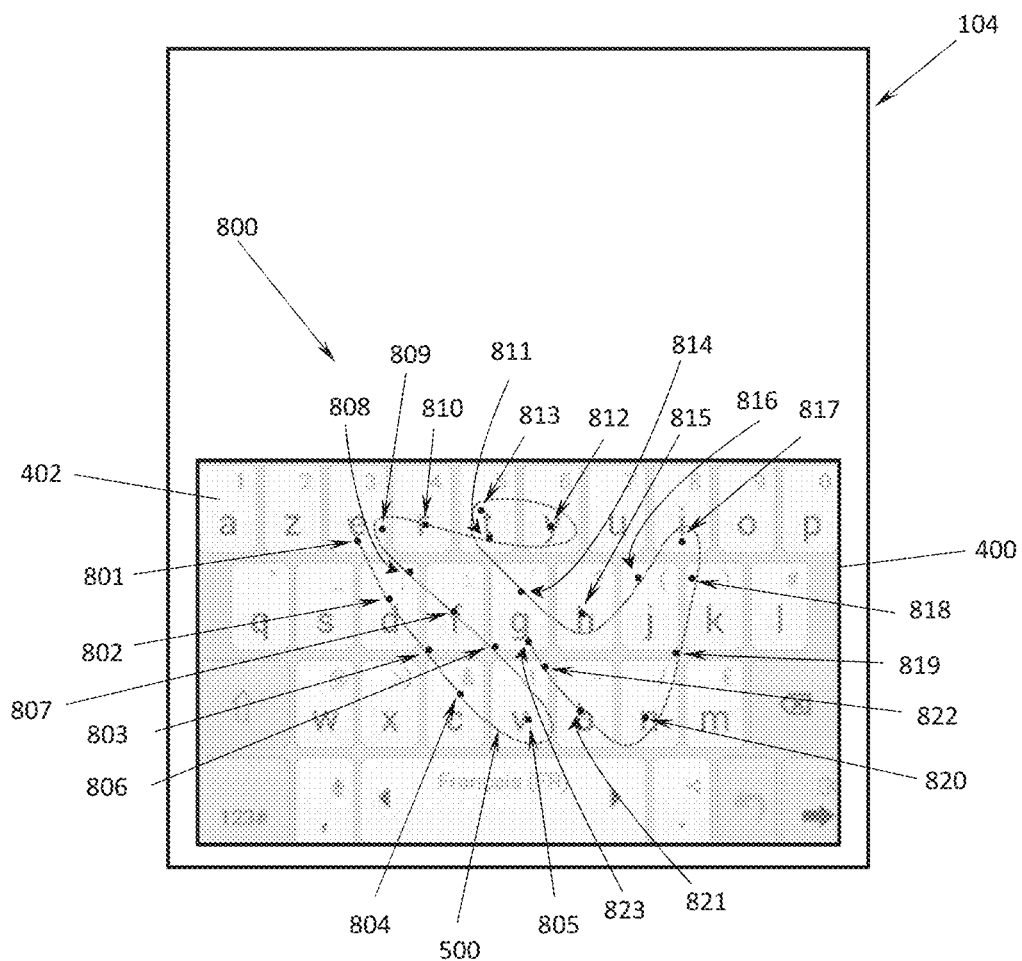
FIG. 8 shows the example stroke-typing input of FIG. 5 with corresponding stroke reference points determined in accordance with an example of the present system and method.
Figure 9:
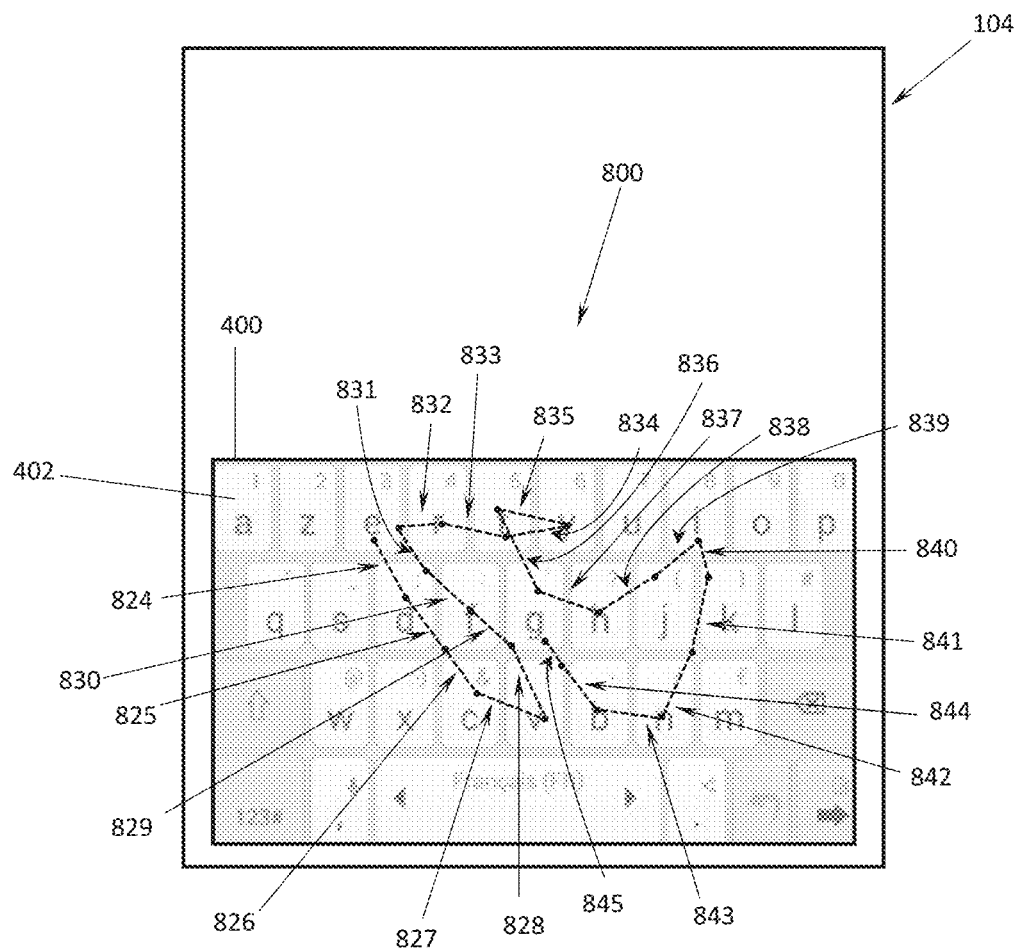
FIG. 9 shows an example reference stroke including path portions linking the reference points of FIG. 8 determined in accordance with an example of the present system and method.

FIGS. 8-9 show various details of example processing applied to the stroke-typing input 500 of FIG. 5 by the input recognition system 114, particularly with respect to the processing performed by the segmentation and character experts 122 and 124 of the candidate selection stage 118.

With respect to handwriting input recognition, the segmentation expert 122 may form element hypotheses by grouping consecutive segments or snippets of the original input handwritten strokes, so-called 'raw ink' to obtain the segmentation graph where each node corresponds to at least one element hypothesis and where adjacency constraints between elements are handled by the node connections. In this segmentation, particular points in each stroke for defining the segments are pre-determined (e.g., based on pre-defined absolute or percentage distances between points) or dynamically determined (e.g., based on characteristics of the strokes, such as shape, changes in direction, weight or thickness, height or length). This technique may result in 'over-segmentation' of the strokes, which may be optimized or reduced based on known handwritten character parameters, for example. In the present system and method, the segmentation expert 122 applies similar segmentation to the stroke of the stroke-typing input by re-sampling the typed stroke.

For example, FIG. 8 shows the stroke-typing input 500 as depicted in FIG. 5 but with the keyboard panel 400 de-emphasized for illustration purposes only. As described earlier, the input management system 112 provides the single continuous stroke of the stroke-typing input 500 to the input recognition system 114. The segmentation expert 122 analyzes the path of the stroke 500 to determine a sequence of points 800 in relation to the path for segmentation of the stroke 500. This sequence of points 800 is determined for stroke-typing based on the keyboard layout information 128 rather than parameters of handwritten characters as in the case of handwriting recognition. That is, the segmentation expert 122 determines at least one point in relation to the stroke path 500 for each of the keys according to the keyboard layout information 128 that the path passes directly over or substantially near, e.g., within a pre-defined and/or settable (such as via the user interface (UI)) distance.

These points may be determined in a number of ways. For example, in some of the conventional techniques described earlier, points on the raw stroke or trace are used based on closest distance to dimensional elements of each key, e.g., the center of the key, edges of the key, area of the key. However, such 're-sampling' may cause inherent errors in the stroke being included or emphasized, such as excessive 'wobble' or 'wiggle', excessive deviations, directional errors, etc. Accordingly, the present system and method determines the sequence of points in a manner which reduces the influence of such errors. This is achieved by determining a common or reference point for a group or range of points on the path, the position of which is compared or related to the keys of the keyboard layout. In this way, a reference stroke is determined which characterizes the input handwritten stroke for recognition processing by the handwriting recognition system.

In the illustrated example of FIG. 8 the reference points are determined by the input recognition system 114 as the centroids of consecutive re-sampled points of the raw stroke that share the same closest key. The consecutive points may be continuous or have distances therebetween as pre-defined, dynamically defined, and/or settable, through the UI for example, to provide optimal segmentation.

As can be seen from FIG. 8, the sequence of reference points 800 is determined to include a reference point 801 related to the key "e", a reference point 802 related to the key "d", a reference point 803 related to the key "f", a reference point 804 related to the key "c", a reference point 805 related to the key "v", a reference point 806 related to the key "g", a reference point 807 related to the key "f", a reference point 808 related to the key "d", a reference point 809 related to the key "e", a reference point 810 related to the key "r", a reference point 811 related to the key "t", a reference point 812 related to the key "y", a reference point 813 related to the key "t", a reference point 814 related to the key "g", a reference point 815 related to the key "h", a reference point 816 related to the key "j", a reference point 817 related to the key "i", a reference point 818 related to the key "k", a reference point 819 related to the key "j", a reference point 820 related to the key "n", a reference point 821 related to the key "b", a reference point 822 related to the key "v" and a reference point 823 related to the key "g" in succession.

It is understood that parameters other than centroids for determining the common points are possible, such as the point at mean or average distance, from the shared closest key, the central point in the range of points having a shared closest key. Also, ranges of points other than those having a shared closest key may be used, such as only points on a portion of the path that overlay a key.

Upon determining the reference points the input recognition system 114, or the input management system 112, may also construct the sequence of reference points as a reference stroke by linking or connecting the determined points. In the simplest form, these reference stroke portions or segments are defined as lineal connections between consecutive points.

For example, FIG. 9 shows the reference stroke 800 as determined to include a stroke portion 824 between the points 801 and 802, a stroke portion 825 between the points 802 and 803, a stroke portion 826 between the points 803 and 804, a stroke portion 827 between the points 804 and 805, a stroke portion 828 between the points 805 and 806, a stroke portion 829 between the points 806 and 807, a stroke portion 830 between the points 807 and 808, a stroke portion 831 between the points 808 and 809, a stroke portion 832 between the points 809 and 810, a stroke portion 833 between the points 810 and 811, a stroke portion 834 between the points 811 and 812, a stroke portion 835 between the points 812 and 813, a stroke portion 836 between the points 813 and 814, a stroke portion 837 between the points 814 and 815, a stroke portion 838 between the points 815 and 816, a stroke portion 839 between the points 816 and 817, a stroke portion 840 between the points 817 and 818, a stroke portion 841 between the points 818 and 819, a stroke portion 842 between the points 819 and 820, a stroke portion 843 between the points 820 and 821, a stroke portion 844 between the points 821 and 822 and a stroke portion 845 between the points 822 and 823.

In the drawings, the reference stroke portions or segments are shown in dashed lines and the reference points are shown as points. It is understood that this is for illustration purposes only and the reference stroke is not necessarily displayed on the input interface 104 of the device 100.

As can be seen, the reference stroke 800 is a representation of the input stroke 500, with stroke portions or segments defined by segmentation points. In this way, the input stroke for typing keys 402 of the keyboard panel 400 is segmented by the segmentation expert 122 in a similar manner to handwritten strokes of characters. With respect to recognition of such handwriting, the input recognition system 114 formulates and tests character hypotheses for each of these segments and groups of these segments.

In particular, the character expert 124 provides classification of the features of the handwritten characters extracted by a character classifier (not shown) and outputs a list of element candidates with probabilities or recognition scores for each node of the segmentation graph determined by the segmentation expert 122. That is, the result for each node of the segmentation graph, e.g., each segmentation point and associated segment (or groups thereof), is a set of possible characters with associated probabilities based on the characteristics of that segment (or group of segments).

The classifier may incorporate information related to characteristics of handwritten characters, such as shape, slant, etc. which assists the candidate selection stage 118 in recognizing characters of candidates suggested by the other experts 122 and 126. Many types of classifiers could be used to address this recognition task, e.g., Support Vector Machines, Hidden Markov Models, or Neural Networks such as Multilayer Perceptrons, Deep, Convolutional or Recurrent Neural Networks. The choice depends on the complexity, accuracy, and speed desired for the task.

In the present system and method, the character expert 124 utilizes the keyboard layout information 128 in a similar manner to the character classifier. That is, the layout information 128 provides the characters or commands (such as, keyboard layout change, menu launching and editing operations on the displayed recognized content, for example) assigned to each of the keys 402/404 of the displayed keyboard panel 400. Thus, from the layout-to-point mapping for the reference points of the reference stroke determined by the segmentation expert 122, the input recognition system 114 determines the character(s) or functions corresponding to the keys 402/404 and outputs a list of element candidates with probabilities or recognition scores for each of the nodes of the segmentation graph. That is, the result for each node of the segmentation graph, e.g., each reference point and associated reference stroke segment, may be a set of possible keys (characters) with associated probabilities based on the characteristics of reference stroke.

For example, for the reference point 801, the key candidate list determined by the character expert 124 from the keyboard layout information 128 includes the key 402 corresponding to the character "e" and the adjacent keys 402 corresponding to the characters "z", "r", "s" and "d". The associated probability scores for these candidates may have the character "e" ranked highest, as the reference point 801 is on the character "e" key 402, the character "d" ranked next, as the reference point 801 is closer to the character "d" key 402 than the character "z", "s" and "r" keys 402 (in this determination it may also be taken in to account that the segment 824 associated with the reference point 801 progresses over the character "d" key 402), and the other characters "z", "s" and "r" ranked lowest. In this way, a type of fuzzy logic is applied.

The character expert 124 may adjust the probability scores for these fuzzy points and add character alternatives based on surrounding keys of the layout, keys that may or may not be included for stroke-typing, and/or for those not directly accessible through the displayed layout (e.g., accented variants of characters, like é, è, ê for e). This can be done for all detected points, e.g., for all element hypotheses representing all nodes of the segmentation graph, or for only those points that are considered fuzzy, e.g., the detected point is far from the center of a key.

The character expert 124 may incorporate additional information of the stroke path, such as track starting and termination points and points of inflection in the path spatially and/or temporally (e.g., changes in direction, curvature, slowing down and speeding up), in order to adjust the probability score of each possible character, which assists the candidate selection stage 118 in recognizing characters of candidates suggested by the other experts 122 and 126.

Keyboard layout change may also be provided by interaction with the input panel 400 such as input of a multiple-point gesture, like swiping, in order to 'reveal' display of different keyboard layouts. Further, a keyboard layout may provide access to alternatives of the displayed character keys, such as accents, upper/lower case, language changes, symbols, numbers, etc., through multiple interactions or long-press or pressure interactions with single keys, particularly on reduced size keyboard layouts having limited keys displayed.

As discussed earlier, the segmentation applied for handwriting recognition leads to over-segmentation, e.g., too many paths in the segmentation graph. This enhances the accuracy of the handwriting recognition through best segmentation path selection based on dynamic processing of the character and language experts 124 and 126 on the hypotheses dynamically provided by the segmentation expert 122. The re-sampling performed by the present system and method to provide the re-sampled or reference stroke similarly over-segments the input typing stroke in order to achieve similar enhanced accuracy.

In the handwriting recognition processing, consecutive segments are successively grouped and the segmentation graph is built with multiple paths having nodes defining the differently grouped segments. The candidate characters and associated probabilities of each of these nodes are provided by the character expert 124 through consideration of the re-formed or combined segments by the character classifier, as described earlier. In the present system and method the segmentation expert 122 similarly successively groups consecutive segments of the reference stroke to build the segmentation graph with multiple node paths, and the character expert 124, or the input recognition system 114, combines the candidate keys and associated probability scores of the reference points of the combined segments in order to provide a combined list of candidate keys and associated probabilities. The scored segmentation graph is analyzed by the language expert 126 as described earlier.

This combination may be performed in a number of ways depending on the level of precision required. For example, the combined candidates may be at least a subset of the available candidates, such as only the candidates of the last reference point (in time-order) of the combined segments or the highest ranked candidates with combined probability scores.

The former case omits information of the reference points between subsequent nodes in the segmentation graph, thereby skipping those points. For example, from the reference stroke 800 of FIG. 8, the segmentation graph may include a path with the reference point 801 as an initial (first) node and a (second) consecutive node having the key candidates and probability scores determined for the reference point 805, but not those determined for the intervening reference points 802, 803 and 804.

The latter case adjusts the key candidate list based on re-calculation of the associated probabilities. For example, from the reference stroke 800 of FIG. 8, the segmentation graph may include a path with the reference point 801 as an initial (first) node and a (second) consecutive node having the top-ranked (for example, the top five to ten) combined key candidates based on the combined probability scores for all of the reference points 801-805. The combination of the probability scores may be performed through application of certain functions, such as addition, multiplication, logarithmic, clustering, with or without weightings applied, such as in consideration of the afore-described characteristics of the input stroke 500 and/or reference stroke 800.

By this processing the input recognition system 114 provides at the output 120 the most likely text candidate(s), including words with or without grammatical marks, as described earlier. By this process, in the illustrated example the output 120 may include the candidate word of "everything" as the most likely recognition candidate based in the analysis of the character selection stage 118.

While the foregoing has described what is considered to be the best mode and/or other examples, it is understood that various modifications may be made therein and that the subject matter disclosed herein may be implemented in various forms and examples, and that they may be applied in numerous other applications, combinations, and environments, only some of which have been described herein. Those of ordinary skill in that art will recognize that the disclosed aspects may be altered or amended without departing from the true spirit and scope of the subject matter. Therefore, the subject matter is not limited to the specific details, exhibits, and illustrated examples in this description. It is intended to protect any and all modifications and variations that fall within the true scope of the advantageous concepts disclosed herein.

We claim:

1. A system for recognizing content associated with handwritten stroke input to a computing device, the computing device comprising a processor, a memory and at least one non-transitory computer readable medium storing programs, which when executed by the processor, cause the processor to perform operations comprising:

receiving a user input via an interactive key layout displayed on an interface surface of a computing device, wherein the user input comprises one of a handwriting input, a typing input, or a stroke-typing input;

detecting a handwritten stroke based on the received user input;

determining a sequence of points forming a path of the detected handwritten stroke;

identifying a interactive key sequence of the interactive key layout disposed on the path of the detected handwritten stroke;

identifying, for each key of the interactive key sequence, a plurality of points from the sequence of points that are located within the key;

determining, for each key of the interactive key sequence, a reference point located at a centroid of the plurality of points;

determining a sequence of the reference points associated with the interactive key sequence of the interactive key layout;

identifying a reference stroke of the detected handwritten stroke based on the determined sequence of the reference points associated with the interactive key sequence;

assigning one or more probability scores to one or more candidate characters associated with each key of the interactive key sequence; and causing recognition of one or more sequences of characters by applying a language model in accordance with the assigned probability scores.

2. The system according to claim 1, the operations further comprising:

determining one or more combined probability scores of at least a subset of candidate characters of a combination of consecutive points of the sequence of reference points; and causing recognition of one or more sequences of characters by applying a language model in accordance with the determined combined probability scores.

3. A method for recognizing content associated with handwritten stroke input to a computing device, the method comprising:

receiving a user input via an interactive key layout displayed on an interface surface of a computing device, wherein the user input comprises one of a handwriting input, a typing input, or a stroke-typing input;

detecting a handwritten stroke based on the received user input;

determining a sequence of points forming a path of the detected handwritten stroke;

identifying a interactive key sequence of the interactive key layout disposed on the path of the detected handwritten stroke;

identifying, for each key of the interactive key sequence, a plurality of points from the sequence of points that are located within the key;

determining, for each key of the interactive key sequence, a reference point located at a centroid of the plurality of points;

determining a sequence of the reference points associated with the interactive key sequence of the interactive key layout;

identifying a reference stroke of the detected handwritten stroke based on the determined sequence of the reference points associated with the interactive key sequence;

assigning one or more probability scores to one or more candidate characters associated with each key of the interactive key sequence; and causing recognition of one or more sequences of characters by applying a language model in accordance with the assigned probability scores.

4. The method according to claim 3, further comprising:

determining one or more combined probability scores of at least a subset of candidate characters of a combination of consecutive points of the sequence of reference points; and causing recognition of one or more sequences of characters by applying a language model in accordance with the determined combined probability scores.

5. A non-transitory computer readable medium having a computer readable program code embodied therein, said computer readable program code adapted to be executed to implement a method for recognizing content associated with handwritten stroke input to a computing device, the computing device comprising a processor, a memory and at least one non-transitory computer readable medium for recognizing content under control of the processor, the method comprising:

receiving a user input via an interactive key layout displayed on an interface surface of a computing device, wherein the user input comprises one of a handwriting input, a typing input, or a stroke-typing input;

detecting a handwritten stroke based on the received user input;

determining a sequence of points forming a path of the detected handwritten stroke;

identifying a interactive key sequence of the interactive key layout disposed on the path of the detected handwritten stroke;

identifying, for each key of the interactive key sequence, a plurality of points from the sequence of points that are located within the key;

determining, for each key of the interactive key sequence, a reference point located at a centroid of the plurality of points;

determining a sequence of the reference points associated with the interactive key sequence of the interactive key layout;

identifying a reference stroke of the detected handwritten stroke based on the determined sequence of the reference points associated with the interactive key sequence;

assigning one or more probability scores to one or more candidate characters associated with each key of the interactive key sequence; and causing recognition of one or more sequences of characters by applying a language model in accordance with the assigned probability scores.

6. The non-transitory computer readable medium according to claim 5, further comprising:

determining one or more combined probability scores of at least a subset of candidate characters of a combination of consecutive points of the sequence of reference points; and causing recognition of one or more sequences of characters by applying a language model in accordance with the determined combined probability scores.

\* \* \* \* \*